March 19, 1935.  E. B. SHAND  1,994,900
SYNCHRONOUS MOTOR CONTROL
Filed June 27, 1934   3 Sheets-Sheet 1

WITNESSES:

INVENTOR
Errol B. Shand.
BY
ATTORNEY

March 19, 1935.  E. B. SHAND  1,994,900
SYNCHRONOUS MOTOR CONTROL
Filed June 27, 1934  3 Sheets-Sheet 2
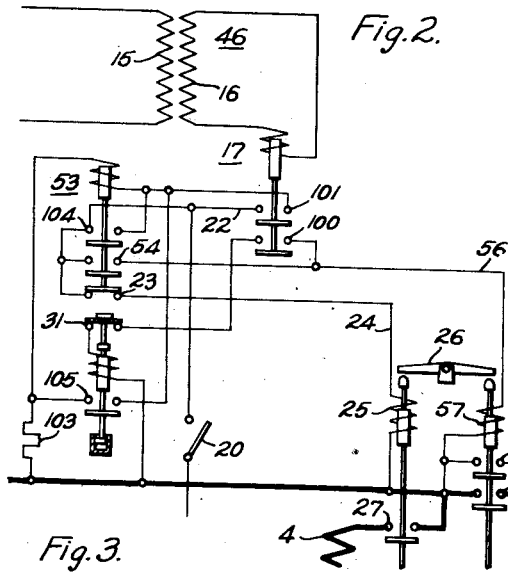
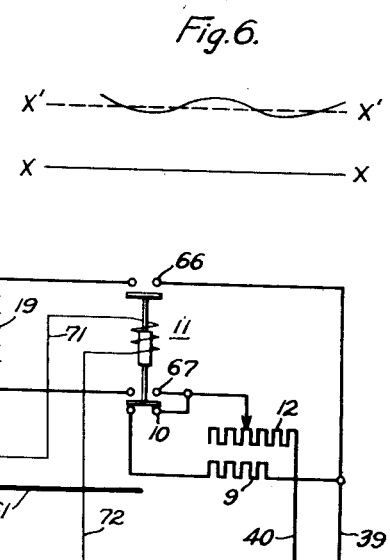
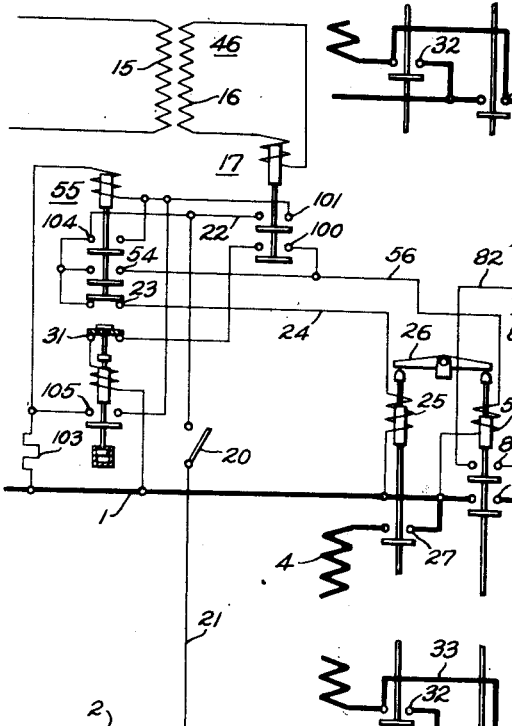
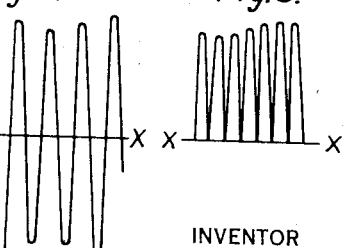
INVENTOR
Errol B. Shand
BY
W. R. Coley
ATTORNEY March 19, 1935.

E. B. SHAND 1,994,900

SYNCHRONOUS MOTOR CONTROL

Filed June 27, 1934

WITNESSES
Wm. C. Groome
Paul E. Friedemann

INVENTOR
Errol B. Shand.
BY
W. R. Coley
ATTORNEY

Patented Mar. 19, 1935

1,994,900

UNITED STATES PATENT OFFICE 1,994,900

SYNCHRONOUS MOTOR CONTROL

Errol B. Shand, Pittsburgh, Pa., assignor to Westinghouse Electric & Manufacturing Company, East Pittsburgh, Pa., a corporation of Pennsylvania Application June 27, 1934, Serial No. 732,712

25 Claims. (Cl. 172—289)

My invention relates to motor starters and particularly to systems for automatically starting synchronous motors.

The invention disclosed in this application is a continuation in part of my copending application filed January 7, 1932, Serial No. 585,195, relating to Synchronous motor control, and contains all of the subject matter included in the application just mentioned plus only such additional subject matter that will make my invention more practical than the circuits disclosed in the former application.

In the previously filed application, through an inadvertence, such circuits, which in themselves are not part of my invention, but which do show my invention in its practical relation to the switching arrangements for a synchronous motor, were omitted. This application includes the necessary circuits. My invention is now more completely disclosed, so that others can make, construct, compound and use the same.

It has been observed, from experiments with synchronous motors to determine their characteristics, that the starting current during the starting operation of a synchronous motor, when the field circuit is closed through a discharge resistor, is modified, and that the modification is in direct proportion to the percent slip. At zero slip, the modifying effect disappears.

Since the starting current or load current during the starting operation is of modified character and such modification is a function of the percent slip, the starting connections and the excitation circuits for the field windings during starting and during resynchronizing, when the motor has pulled out of step because of an excessive load, could be effectively controlled if means were provided which are responsive to the modifications of the starting current.

It is one of the objects of my invention to control the starting of a synchronous motor in response to the modifications present in the starting current of a synchronous motor.

Another object of my invention is to change the connections of a synchronous motor from a starting connection to a running connection in response to some electrical characteristics of the starting current of the synchronous motor.

A further object of my invention is to control the starting of a synchronous motor by changing the armature connections from starting connections to running connections in response to changes in the characteristics of the armature current.

It is also an object of my invention to control the starting of a synchronous motor by changing the field circuit connections from starting connections to running connections as a function of some characteristics of the starting current.

A further object of my invention is to control the starting circuits of a synchronous motor by certain characteristics of the starting current and time.

One of the objects of my invention is the provision of a simple and efficient arrangement for automatically effecting the acceleration of synchronous motors to synchronous speed and for maintaining the proper circuit connections once synchronous speed has been attained.

A still further object of my invention is to control the circuit connections of a synchronous motor when the motor has pulled out of step for any reason to effect automatic re-synchronization in response to certain operating characteristics of the motor.

Other objects and advantages will be more readily apparent from a study of the following specification when studied in conjunction with the accompanying drawings, in which:

Figs. 2 and 3 are diagrammatic showings of other embodiments of my invention;

Fig. 4 shows graphically the characteristics of the starting current of a synchronous motor;

Fig. 5 shows graphically the characteristics of the starting current when rectified;

Fig. 6 shows graphically the resulting slip frequency current after the higher harmonics, shown in Fig. 5, have been suppressed;

Figure 1:
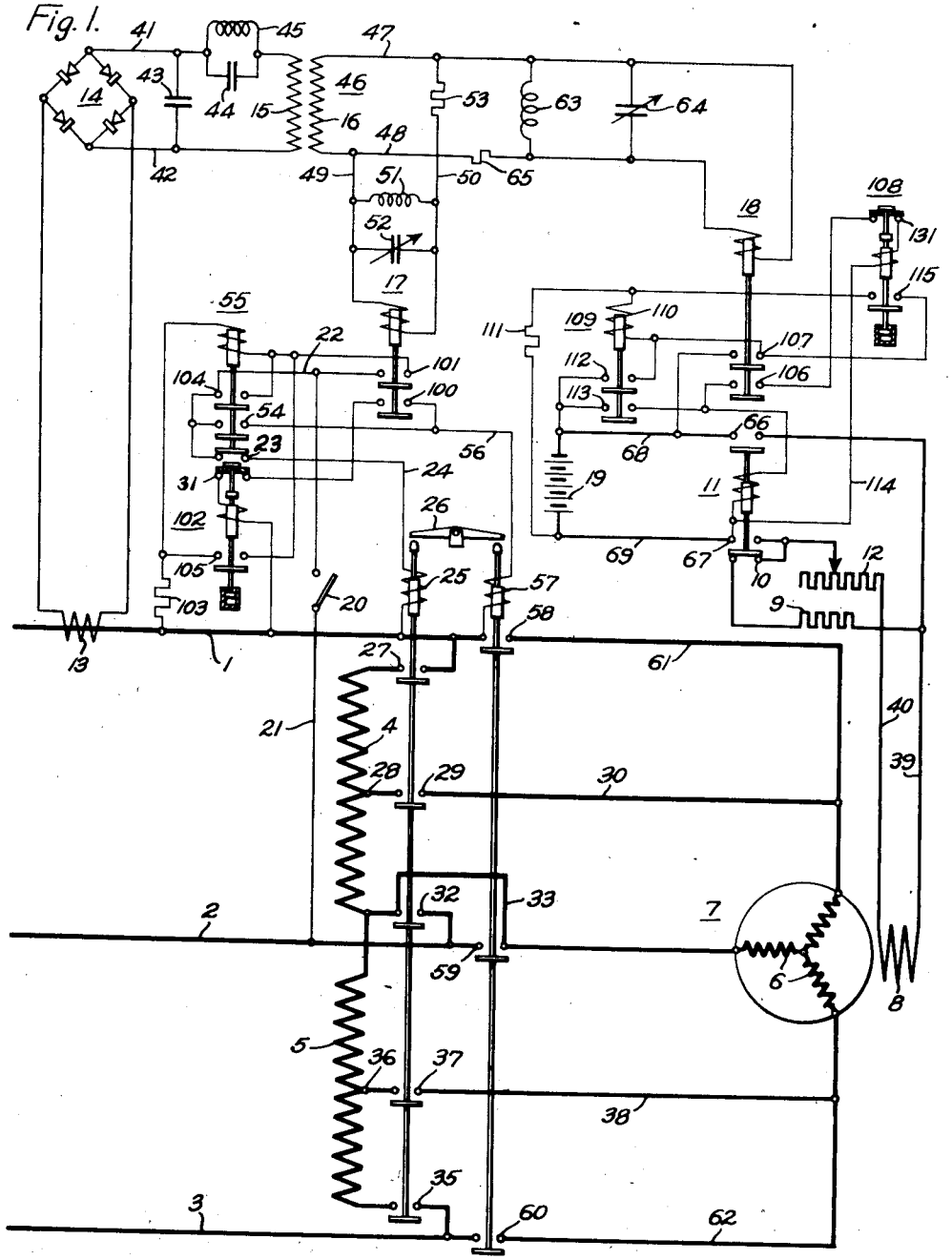
Figure 1 is a diagrammatic showing of a control system showing one embodiment of my invention.

Referring more particularly to Fig. 1 of the drawings, reference characters 1, 2 and 3 designate the supply conductors of a suitable source of three-phase alternating current, and reference characters 4 and 5 represent an autotransformer disposed to supply low voltage to the armature windings 6 of the synchronous motor 7 during the starting operation. The synchronous motor has a field winding 8 provided with a discharge resistor 9, which is connected to the field winding through back contact members 10 of the field contactor 11 and the rheostat 12, during the starting operation.

To properly control the low-voltage main line contactor and a high-voltage main line contactor and the circuit connections for the field windings, a main line conductor, as 1, is provided with a current transformer 13 connected in circuit relation with a double-wave rectifier 14. A plurality of reactors and condensers, and a pair of transformer windings 15 and 16 are interconnected with the direct-current taps of the rectifier 14, and by means of a pair of frequency relays 17 and 18 control the sequence of the starting operation for the synchronous motor 7. The source of direct current for the field windings 8 is shown as a battery 19. It is, of course, understood that any other source of direct current, such as a generator or exciter coupled to the shaft of the synchronous motor, may be utilized. A better understanding of the novel features of my invention and its relation to a synchronous motor can probably be had from a study of the starting sequence of a synchronous motor.

Assuming the attendant wishes to start the synchronous motor 7, he thereupon actuates the switch 20, thereby establishing a circuit from the main line conductor 2, through conductor 21, switch 20, conductor 22, back contact member 23 of the control relay 55, conductor 24, actuating coil 25 of the low-voltage line contactor to the main line conductor 1. It will be noted that a mechanical interlock 26 is provided for the two main line contactors, so that when one of these contactors is caused to operate, the other is prevented from operating and vice versa.

Operation of the low-voltage line contactor establishes a circuit from the main line conductor 1, through contact members 27, a portion of the winding of the auto-transformer 4, low-voltage junction 28, contact members 29 and conductor 30 to the stator or armature windings 6 of the synchronous motor 7. A second circuit is also established from the main line conductor 2 through the contact members 32 and conductors 33 and 34 to the stator 6 of the synchronous motor. A third circuit is also established from the main line conductor 3 through contact members 35, a portion of the winding of the auto-transformer 5, low-voltage junction 36, contact members 37 and conductor 38 to the stator windings 6. Low voltage is, therefore, supplied to the armature windings of the synchronous motor. By the application of this low voltage, shocks, both to the machine and the supply circuit, are avoided.

The field winding 8, during the application of the low voltage to the synchronous motor, is connected in a closed circuit through the discharge resistor 9. This circuit for the field winding may be traced from the field winding through conductor 39, discharge resistor 9, back contact members 10 of the field contactor 11, a portion of the field rheostat 12 and corductor 40 to the field winding 8. It is a well known fact that a synchronous motor while operating below synchronous speed induces a current in the field winding by transformer action. It has been discovered that the interaction of this induced field current and the alternating current flowing in the stator modifies the characteristics of a starting current in the armature of the synchronous motor in the manner shown in Fig. 4. To take advantage of this modification of the starting current, a current transformer 13 is associated with one of the main line conductors, as 1, and the current transformer is interconnected with a double-wave rectifier 14.

Connected to the direct-current taps of the rectifier 14 are conductors 41 and 42. The current flowing in conductors 41 and 42, when connected in closed circuit relation, is graphically shown in Fig. 5. It will be noted that the frequency of the pulsating direct current is twice the frequency of the alternating current supplied to the synchronous motor, but that the modulations of the armature current or the envelope of the direct current, that is, the locus of the maximums of the pulsating current, nevertheless corresponds to the locus of the maximums of the unrectified alternating starting current flowing through the stator winding of the synchronous motor.

A pair of condensers 43 and 44 and a reactor 45 and the primary winding 15 of the transformer 46 are connected in circuit relation with the conductors 41 and 42 in the manner shown. The capacities of the two condensers and the characteristics of the reactor are so chosen that the higher harmonics of the pulsating current are eliminated and a direct current, having the characteristics shown in Fig. 6 when referred to the axis $x$—$x$, flows through the primary winding 15 of the transformer 46. The current induced in the secondary winding 16 of the transformer will, therefore, have characteristics such as shown in Fig. 6 if referred to the axis $x'$—$x'$. Furthermore, the characteristics, namely, the frequency of the rectified current, are a function of the slip frequency of the synchronous motor. It is, therefore, apparent that the current flowing in the secondary winding 16 can be utilized to control the circuit connections for the armature winding transferring said winding from the low-voltage connection to the high-voltage connection; may also be utilized in connecting the field windings 8 to the source of supply 19 when the synchronous motor has attained a predetermined percent of synchronous speed; and may be utilized to effect automatic re-synchronization when the motor has pulled out of step.

Conductors 47 and 48 are connected to the terminals of the secondary windings 16 of the transformer 46, and conductors 49 and 50, connected to these conductors, are interconnected with a reactor 51, a variable condenser 52 and a resistor 53. The reactor, resistor and condenser are utilized to control the actuating coil of the frequency relay 17, so that by a proper tuning, the relay 17 will operate at any selected percent of synchronous speed of the synchronous motor. For example, the relay 17 may be caused to operate when the rotor or field winding 8 has attained, say, 85 to 90% of synchronous speed.

Operation of the frequency relay 17 causes a closing of the contact members 100 and 101, which latter contact members cause the energization of the actuating coil of the control relay 55. The circuit for the control relay 55 may be traced from the energized conductor 21 through switch 20, contact members 101, the actuating coil of the control relay 55, and resistor 103 to the main line conductor 1. Operation of control relay 55 establishes a circuit for the time limit relay 102 from the energized conductor 22 through contact members 54 of the control relay 55, contact members 100 of the frequency relay 17, the reset contact members 31 and the actuating coil of the time limit relay 102 to the main line conductor 2. It will thus be noted that in the operation of the frequency relay 17, the circuit for the actuating coil 25 of the low-voltage line contactor is interrupted at the contact members 23 and a circuit is established for the actuating coil 57 of the full-voltage line contactor. The circuit for the full-voltage line contactor may be traced from the main line conductor 2 through conductor 21, switch 20, conductor 22, contact members 54 of the control relay 55, conductor 56, and actuating coil 57 of the full-voltage line contactor to the main line conductor 1. Contact members 58, 59 and 60 are, therefore, closed and the mechanical interlock 26 insures that the contact members 27, 29, 32, 37 and 35 are opened. Full voltage is thus supplied to the armature windings 6 of the synchronous motor through contact members 58, 59 and 60 and the conductors 61, 34 and 62, respectively.

It will be noted that a holding circuit is established for the actuating coil of the relay 55, which holding circuit may be traced from the energized conductor 22 through contact members 104, the actuating coil of the control relay 55 and the resistor 103 to the main line conductor 1. Contact members 54 and 104 thus remain closed and contact member 23 opened, independent of any subsequent operations of the frequency relay 17. The time limit relay 102 is, however, subject to subsequent operations of the frequency relay 17.

The time constant of the time limit relay 102 is so chosen that the synchronous motor will normally have pulled into synchronism a considerable time before contact members 105 are closed. As heretofore stated, the slip frequency effect disappears when the synchronous motor pulls into synchronism and in consequence contact members 100 and 101 will open when the motor pulls into synchronism. The opening of contact members 100 deenergizes the actuating coil of the time limit relay 102, and the contact members 105 will, therefore, not close during normal starting operation. This time limit relay is of particular utility during re-synchronization should the motor be pulled out of step by an excessive load or for other reasons, and its utility in this connection will be discussed more in detail hereinafter.

A reactor 63, a variable condenser 64 and a resistor 65 are also interconnected with the conductors 47 and 48 and serve to select the frequency at which the frequency relay 18 is to operate. The selection may be made such that the frequency relay 18 operates when substantially synchronous speed has been obtained by the rotor winding of the synchronous motor, or when, let us say, 97 or 98% of synchronous speed has been attained. The resistors 53 and 65 are inserted in the respective circuits of the frequency relays 17 and 18 so that the tuning circuit for one of the frequency relays may not very materially affect the tuning circuit for the other frequency relay. Furthermore, the relative effects of the respective tuning circuits may be in some cases so chosen that the frequency relay 18 operates before the frequency relay 17 operates. In many instances, it may be desirable to have the synchronous motor fully excited before the transfer is made from the low-voltage to the high-voltage connection, and the particular starting sequence herein disclosed may be reversed so far as the transfer and field application is concerned without departing from the spirit of my invention.

When the frequency relay 18 operates, the contact members 106 and 107 are closed, which latter contact members establish an energizing circuit for the control relay 109. The circuit for the control relay 109 may be traced from the upper terminal of the battery 19 through conductor 68, contact members 107, the actuating coil 110 of the control relay 109, the resistor 111 to the lower terminal of the battery. Operation of the control relay 109 closes the contact members 112 and 113. Closing of the contact members 112 establishes a holding circuit for the control relay 109 so that this control relay is adapted to maintain the field contactor 11 energized, independent of any subsequent operations of the frequency relay 18. Closure of the contact members 113 establishes a circuit from the upper terminal of the battery 19 through contact members 113 and 106, the reset contact members 131, the actuating coil of the time limit relay 108, conductors 114 and 69 to the lower terminal of the battery. An energizing circuit is also established for the field contactor 11, which circuit may be traced from the upper terminal of the battery 19 through contact members 113, actuating coil of the field contactor 11, conductors 69 to the lower terminal of the battery.

Operation of the field contactor 11 closes the contact members 66 and 67, thereby establishing an energizing circuit for the field winding 8, which circuit may be traced from the upper terminals of the battery 19 through conductor 68, contact members 66, conductor 39, field winding 8, conductor 40, field rheostat 12, contact members 67 and conductor 69 to the lower terminal of the battery 19. The operation of the field contactor 11 also opens a discharge circuit for the field winding 8 at the contact members 10. In practice, the mechanical design of the field contactor is such that contact members 10 will open an instant after the closing of contact members 66 and 67, so that the field winding is at no time an open circuit.

The time limit relay 108 will be initiated in its operation the instant the frequency relay 18 operates, but for the normal starting sequence, even though the motor be under load, the time constant of the time limit relay is so selected that the contact members 115 do not close before the motor has pulled into synchronism. The utility of the time limit relay 108 will become more apparent when discussing the question of re-synchronization hereinafter.

From the foregoing explanations of the various circuits established, it is apparent that the synchronous motor is supplied with full voltage and the field winding 8 is supplied with direct current when the rotor is very near the synchronism speed. The synchronous motor, therefore, pulls into synchronism and operates its load at synchronous speed.

My system of control is also well adapted to effect re-synchronization of the synchronous motor if the motor pulls out of step for any cause. If it be assumed that the motor shown in Fig. 1 pulls out of step, a current of a frequency proportional to the slip frequency of the motor at any given instant will traverse the coil of the frequency relays 17 and 18. At a certain percent slip, the contact members 106 and 107 close, which, of course, will have opened, since no current effect is produced on the conductors 47 and 48 at synchronous operation of the motor. The closure of contact members 106 again energizes the actuating coil of the time limit relay 108, and since the load must necessarily have been a heavy load to pull the motor out of step, its tendency to again pull into synchronism, for the time being, is overcome by the load, and the frequency relay 18 will remain energized. In consequence, the time limit relay will continue to operate until its time period has elapsed, whereupon contact members 115 are closed. The closure of contact members 115 establishes a shunt circuit for the actuating coil 110, and in consequence, contact members 112 and 113 open. Opening of the contact members 113 deenergizes the field contactor, thereby disconnecting the source of direct current from the field and again causing the motor 7 to operate as an induction motor. During the induction motor operation, the slip frequency, if sufficiently high for a heavy load that caused pull-out, will also cause the opening of the contact members 106 and 107, thereby resetting the time limit relay 108 and also reestablishing conditions for re-synchronization after the overload is removed exactly in the manner that acceleration and synchronization took place during the normal starting cycle.

If the overload is not excessive but of such value to cause a slip such that relay 18 remains energized, the time limit relay 108 will reset itself to start a second operation by opening its own circuit at the reset contact members 131. When the circuit for time limit relay 108 is opened at the reset contact members 131, after the lapse of a longer time constant than is required for the closing of contact members 115, the reset contact members 131 are reclosed. The synchronous motor is thus caused to make periodic attempts to be re-synchronized.

If the overload persists so that there be danger of burning out the induction motor windings, the frequency relay 17 will, of course, operate and initiate the operation of the time limit relay 102, which, after the lapse of a predetermined interval of time, will shunt out the actuating coil of the control relay 55 by the closure of contact members 105, and thereby disconnect the motor from the full-voltage connection to the lower voltage connection by opening the circuit for the actuating coil 57 of the full-voltage line contactor and by closing the contact members 23 for the low-voltage line contactor. Of course, if the overload is excessive and persists over a comparatively long period of time, the overload protected devices ordinarily supplied with control, and not part of this invention and not shown, will disconnect the motor from the source of supply.

The time limit relay 102 is provided with the reset contact members 31 and is thus caused to repeat its cycle of operation as long as contact members 100 remain closed.

In the modification shown in Fig. 2, the main elements are considered the same yet the field contactor is directly controlled by the operation of the full voltage line contactor and the frequency relay 17 is designed to operate at some frequency such that full voltage is supplied to the armature of the synchronous motor when the rotor has attained a predetermined percent of synchronous speed.

Assuming that the frequency relay 17 has operated at somewhere near synchronous speed of the synchronous motor and the full voltage line contactor has operated because of the energization of its actuating coil 27 from conductor 2 through contact members 23 of the control relay 55 to conductor 1, a circuit is established from the conductor 1 through contact members 70, conductor 71, actuating coil of the field contactor 11 and conductor 72 to the energized conductor 34. It is, therefore, obvious that operation of the full voltage line contactor, except for the time constant of the field contactor 11, directly effects the opening of the discharge circuit for the field winding 8, and similarly effects the connection of the field winding to the source of direct current 19.

In the modification shown in Fig. 3, the frequency relay 17, the line contactors and the motor are like those shown in the modification of Fig. 2, however, the operation of the field contactor does not take place immediately after the operation of the full voltage line contactor, but takes place a predetermined interval of time thereafter. From this modification, it is obvious that the operation of the full voltage line contactor indirectly and after the lapse of a substantially definite time interval, effects the opening of the discharge circuit for the field winding 8 and similarly effects the connection of the field winding to the source of direct current 19.

To control the circuit connections of the field winding so that the field winding is not supplied with direct current prior to the termination of a predetermined interval of time after the operation of the full-voltage line contactor, a time limit relay 73 is associated with the line contactor and the source of direct current 19. This time limit relay is of a well known design and includes a neutralizing coil 74 and a magnetizing coil 75. These respective coils are connected in circuit relation with the source of direct current power 19 by circuits extending from one terminal of the battery through the knife switch 76, magnetizing coil 75, resistor 77 and neutralizing coil 74 and resistor 78, respectively, to the other terminal of the battery 19. The time limit relay is provided with an adjustable spring mechanism 79 by means of which the time constant thereof may be readily adjusted.

Assuming the full voltage line contactor has operated, a circuit is thereby established from the lower terminal of the battery 19 through switch 76, conductor 80, contact members 81 of the full-voltage line contactor, conductor 82 and resistor 77 to the other terminal of the battery 19. It will be noted that this circuit just traced provides a shunt circuit for the magnetizing coil 75 of the time limit relay 73. The magnetizing coil 75 being thus deenergized and the neutralizing coil 74 acting in opposition to the magnetizing coil, the magnetic flux of the time limit relay is caused to decay in a prescribed manner. After a predetermined interval of time, contact members 83 are closed and a circuit is thereby established from the lower terminal of the battery 19 through contact members 83, conductor 84, the actuating coil of the field contactor 11 to the upper terminal of the battery 19. Operation of the field contactor interrupts the discharge circuit for the field winding and connects the field winding to the source of direct current power in a manner heretofore discussed.

Figure 7:
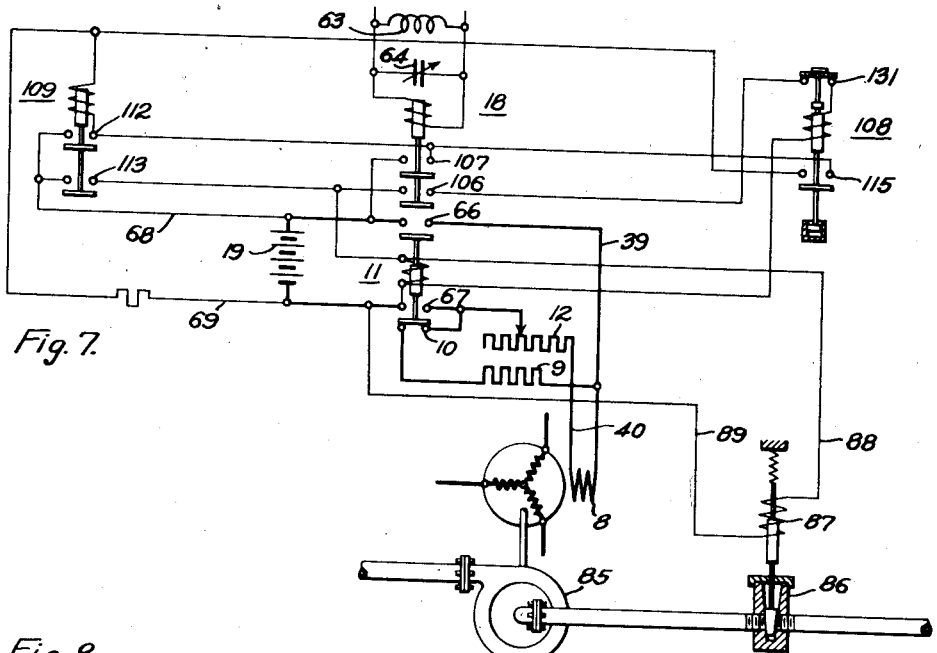
Fig. 7 is a diagrammatic showing of one specific application of my invention.

The modification shown in Fig. 7 shows a specific application of my invention to an unloading system for a compressor operated by a synchronous motor. Since synchronous motors are known to have poor torque characteristics during the starting period, it is very advantageous to have the synchronous motor accelerate without being subjected to a load. Since synchronous motors are frequently called upon to operate loads requiring peak torques for short intervals of time, acceleration to synchronous speed of the synchronous motor may be delayed very much or prevented entirely if no means are provided to unload the synchronous motor. In Fig. 7, 85 designates a compressor pump and 86 designates a valve, spring actuated to such position that the compressor pump operates idle until coil 87 is energized whereupon the pump is called upon to deliver its normal pressure. To prevent the energization of coil 87 prematurely, this coil is connected in a circuit controlled by contact members 113 of the control relay 109 controlling the direct current excitation for the field winding of the synchronous motor. When contact members 113 are in circuit closing position, a circuit is established from the source of direct current 19, through conductor 68, contact members 113, conductor 88, coil 87, and conductors 89 and 69 to the source of direct current 19. The valve 86 is thereupon moved to such position that the load is applied to the synchronous motor.

The showing of the unloading valve 86 is but very diagrammatic. Obviously the valve 86 may be a valve member in the cylinder head of a reciprocating pump or any other means for unloading the synchronous motor.

Figure 8:
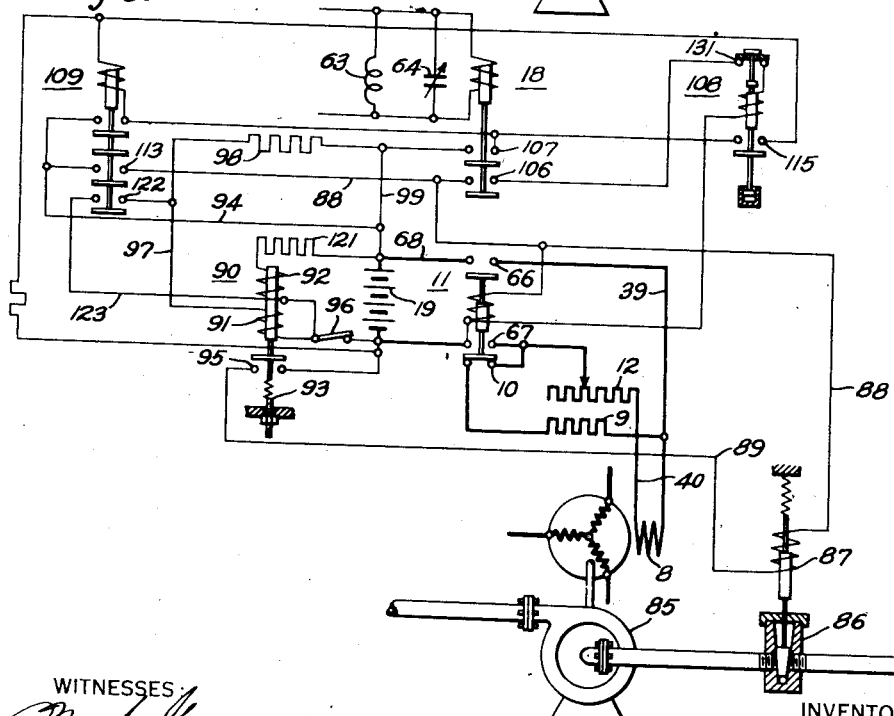
Fig. 8 is a diagrammatic showing of a modification of the specific application shown in Fig. 7.

It frequently happens that the application of the load at the instant that the field winding of the synchronous motor is supplied with direct current excitation is too soon for practical purposes, because when the field winding is supplied with excitation, the rotor of the synchronous motor may slip a pole to pull into synchronism and in doing so, may be subjected to hunting for a short interval of time. Obviously, if the load be applied to the synchronous motor while the rotor is oscillating with reference to the rotating field flux of the stator, the synchronous motor may fail to pull into synchronism. To obviate this difficulty the circuit arrangement shown in Fig. 8 is provided, which arrangement is very much like that shown in Fig. 7, except for the fact that the energization of coil 87 is now also controlled by an inductive time limit relay of well known design. This inductive time limit relay 90 has a magnetizing coil 91 and a neutralizing coil 92 acting in opposition to the magnetizing coil. The effect of the neutralizing coil is negligible when the magnetizing coil is energized. However, it does, in conjunction with the adjustable spring arrangement 93, control the time constant of the relay when the magnetizing coil is deenergized.

Assuming that the frequency relay controlling the excitation of the synchronous motor has closed the contact members 113, a partial circuit is established from the battery 19 through conductors 68 and 94, contact members 113, conductor 88, actuating coil 87 for the unloading valve 86 and conductor 89 to the open contact members 95 of the time limit relay. Both the magnetizing coil and the neutralizing coil of the time limit relay are normally energized by circuits from the battery 19 through switch 96, magnetizing coil 91, conductor 97, resistor 98, and conductors 99 and 68, and neutralizing coil 92, resistor 121 and conductor 68, respectively, to the other terminal of the battery 19.

With the operation of the control relay 109, contact members 122 are closed and a shunt circuit is established for the magnetizing coil 91. This circuit may be traced from conductor 123 through contact members 122 and conductor 97 to the resistor 98. Since the magnetizing coil is thereby deenergized, the time limit relay will, after a predetermined interval of time, close the contact members 95, thereby energizing the actuating coil 87 of the unloading valve 86. From the foregoing it is obvious that the unloading valve will prevent application of the load to the synchronous motor the same instant the field winding is supplied with direct current but the load will be applied a predetermined interval of time after the field circuit has been completed.

It will be noted that the modifications shown in Figs. 7 and 8 also automatically effect re-synchronizing of the synchronous motor. Furthermore, during such re-synchronizing the load on the motor is removed by the proper operation of the valve 86. The time within which the motor is thus re-synchronized is materially shortened.

The foregoing disclosure represents several preferred modifications of my invention, but it is readily understood that other modifications may be devised falling well within the spirit of the foregoing disclosure. The foregoing disclosure is, therefore, not to be taken in a limiting sense, but I wish to be limited only by the scope of the appended claims and the prior art.

I claim as my invention:

1. A control system for starting a synchronous motor, in combination, a synchronous motor having a stator or armature winding, starting and running connections for the armature winding, means for effecting modulations of the current in the armature winding, and means responsive to the modulations of the current in the armature winding for controlling the circuit arrangement for the starting and running connection of the armature.

2. A control system for starting a synchronous motor, in combination, a synchronous motor having a stator or armature winding and a field winding, starting connections for the field winding for causing modulations of the armature current, and running connections for the field winding for exciting the motor, and means responsive to the modulations of the current in the armature winding for controlling the circuit arrangement of the starting and running connections of the field winding.

3. A control system for starting a synchronous motor, in combination, a synchronous motor having an armature winding and a field winding, starting and running connections for the armature winding, starting connections for the field winding for causing modulations in the armature current, and running connections for the field winding for normally exciting the motor, means responsive to modulations of the current in the armature winding for controlling the circuit arrangement for the starting and running connections of the armature winding, and means responsive to modulations of the current in the armature winding for controlling the circuit arrangement of the starting and running connections of the field winding.

4. In a control system for starting synchronous motors, a source of alternating current, a source of direct current, an armature winding, a field winding, low-voltage starting connections for the armature winding, high-voltage running connections, switching means for said low-voltage and high-voltage connections, said field winding constituting means for causing an envelope current in the alternating current in the armature winding, means responsive to given frequency of said envelope current for controlling the operation of the switching means for the high-voltage connection, and means responsive to a given frequency of said envelope current for controlling the connection of the field winding to the source of direct current.

5. In a starting system for a synchronous motor, a source of alternating current therefor having, low-voltage and full-voltage taps, an armature winding, a field winding, a discharge circuit for said field winding, a source of direct current for the field winding, and means responsive to current having a given frequency relative to the slip-frequency component of the starting current for disconnecting the armature from the low-voltage taps and connecting the armature to the high-voltage taps, and means responsive to a current having a given frequency relative to the slip-frequency component of the starting current for connecting the field winding to the source of direct current and for disconnecting the field winding from the discharge circuit.

6. In a starting system for a synchronous motor having an armature, a source of alternating current therefor having low-voltage and full-voltage taps, means for connecting the motor armature to the low-voltage taps, and automatic means responsive to any multiple of the slip-frequency component of the starting current in the armature, for transferring the armature to the full-voltage taps when the motor reaches synchronous speed.

7. In a starting system for a synchronous motor, a source of alternating current of constant frequency therefor having low-voltage and full-voltage taps, means for connecting the motor armature to the low-voltage taps, means for causing a current of varying frequency in the armature during acceleration of the motor, and automatic means responsive to a selected current in the armature winding of $n$-times the slip-frequency, where $n$ is any whole integer, for transferring the armature to the full-voltage taps when the motor reaches substantially synchronous speed.

8. In a starting system for a synchronous motor, a source of alternating current of constant frequency therefor having low-voltage and full-voltage taps, means for connecting the motor armature to the low-voltage taps, means for causing currents of varying frequencies in the armature during acceleration of the motor, and automatic means responsive to a selected current in the armature winding of $n$-times the slip-frequency, where $n$ is any integer from one to ten, inclusive, for transferring the armature to the full-voltage taps when the motor reaches substantially synchronous speed.

9. In a starting system for an alternating current motor, a source of alternating current therefor having low-voltage and full-voltage taps, means for producing current components of varying frequency in the starting current of the motor, and means responsive to a selected frequency of a component of the starting-current for automatically controlling the transfer of the motor armature from the low-voltage to the full-voltage taps when the motor reaches a certain percent of synchronous speed.

10. In a starting system for an alternating-current motor, a stator winding, a rotor winding, starting and running connections for said windings, a source of alternating current having a given frequency, means for inducing currents proportional to the slip-frequencies in the stator, means for connecting said source to one of said windings, and means responsive to any selected multiple of the slip-frequency current induced in the stator winding for selectively transferring said windings from starting connections to running connections.

11. In a starting system for a synchronous motor, a source of alternating current therefor having low-voltage and high-voltage taps, an armature winding, a field winding, a discharge circuit for the field winding, a source of direct current, switching means for automatically disconnecting the armature from the low-voltage taps and connecting the armature to the high-voltage taps, said field winding constituting means for producing currents, proportional to the slip of the motor, in the armature winding, means responsive to a current having a given frequency relative to the slip-frequency component or multiple of the starting current for controlling the operation of said switching means, and means responsive to the operation of the switching means for effecting the connection of the field winding to the source of direct current and disconnecting the field from the discharge circuit.

12. The method of starting an alternating current motor having rotor and stator windings which consists in impressing a low starting voltage across the stator winding, short-circuiting the rotor through a resistor while the low-voltage current is impressed on the stator, impressing full running voltage across the stator winding when the frequency of the slip-frequency component of the starting current in the primary or armature winding is of a given value, connecting the rotor to a source of electrical energy and interrupting the short-circuit of the rotor winding.

13. The method of starting a synchronous motor having conventional armature and field windings which consists in impressing a low starting voltage across the armature winding, short-circuiting the field winding through a discharge resistor while the low-voltage current is supplied to the armature, impressing full running voltage across the armature winding when the frequency of the slip-frequency component of the starting current in the primary or armature winding is of a given value, connecting the field winding to a source of direct current a predetermined interval after the full running voltage is supplied to the armature, and interrupting the short-circuit for the field winding.

14. The method of starting a synchronous motor having conventional armature and field windings which consists in impressing a low-starting voltage across the armature winding, short-circuiting the field winding through a discharge resistor while the low-voltage current is supplied to the armature, impressing full running voltage across the armature winding when the frequency of the slip-frequency component of the starting current in the primary or armature winding is of a given value, connecting the field winding to a source of direct current when the frequency of the slip-frequency component of the starting current is of a certain value, and interrupting the field circuit through the discharge resistor.

15. A control system for re-synchronizing a synchronous motor, in combination, a synchronous motor having a stator or armature winding and a field winding, starting and running connections for the field winding, and means responsive to the modulations in the armature current caused by a temporary overload sufficient in magnitude and period of action to establish said starting connections and responsive to certain characteristics in the armature current to reestablish the running connections.

16. A control system for re-synchronizing a synchronous motor, in combination, a synchronous motor having an armature winding and a field winding, synchronizing and running connections for the armature winding, synchronizing and running connections for the field winding, means responsive to the frequency of certain modulations of the armature current in the armature winding when the motor has pulled out of step for successively establishing synchronizing and running connections for the armature winding, and means responsive to the frequency of higher harmonics of the armature current for successively establishing synchronizing and running connections for the field winding.

17. In a control system for re-synchronizing a synchronous motor that has been pulled out of step, in combination, a plurality of motor windings, re-synchronizing and running connections for the motor windings, and means responsive to the frequency of the envelope current of the alternating current in one of said windings to transfer selected motor windings from the re-synchronizing connections to the running connections.

18. In a system for controlling the operation of synchronous motors having armature and field windings, re-synchronizing means including re-synchronizing and running connections for said windings, and means responsive to the frequency of a certain current in the armature winding for successively establishing said re-synchronizing and running connections.

19. In a control system for a synchronous motor, a source of alternating current therefor having low-voltage and full-voltage taps, means for connecting the motor armature to the low-voltage taps, and automatic means responsive to a function of the slip-frequency component of the armature current for connecting, for disconnecting, and for reconnecting the armature to the full-voltage taps.

20. In a control system for a synchronous motor, in combination, an armature winding, a field winding for the motor, a discharge circuit for the field winding, a source of direct current for the field winding, and automatic means responsive to any selected multiple of the slip-frequency component of the armature current for connecting said field winding to the source of direct current and disconnecting the field winding from the discharge circuit.

21. In a control system for a synchronous motor, an armature winding, a source of alternating current, means for connecting the armature to said source, a field winding having starting circuit connections and running circuit connections, and automatic means responsive to any selected one current in the armature winding $n$-times the slip-frequency, where $n$ is any whole integer, adapted to transfer the field winding from the starting circuit connections to the running circuit connections.

22. In a control system for a synchronous motor having an armature, a source of alternating current therefor, means for connecting the motor armature to the source of energy, synchronizing circuit connections and running circuit connections for certain motor circuits, and means responsive, during starting and re-synchronizing of the motor, to selected frequencies of a component of the starting current in the armature for automatically controlling the transfer of said certain motor circuits from the synchronizing circuit connections to the running circuit connections.

23. In a starting system for an alternating-current motor, a stator winding, a rotor winding, accelerating circuit connections and running circuit connections for said windings, a source of alternating-current energy having a given frequency, means for connecting said source to one of said windings, and means responsive to any selected multiple of the slip-frequency induced in the winding connected to said source of energy for transferring the other of said windings from the accelerating circuit connections to the running circuit connections.

24. In a control system for starting synchronous motors, a pair of motor windings, starting and running connections for the motor windings, one of said pair of windings constituting means for causing an envelope current in the alternating current of the other of said windings, and means responsive to the frequency of said envelope current of the alternating current in one of said motor windings to selectively transfer either of said motor windings from starting to running connections.

25. In a control system for starting a synchronous motor having armature windings and field windings, said field windings constituting means for producing currents of varying frequencies in the armature windings during acceleration of said motor, starting connections and running connections for both said windings, and means responsive to selected frequencies of said currents of varying frequencies in the armature windings for transferring both said windings from their respective starting connections to their respective running connections at selected points, during the accelerating period of the motor.

ERROL B. SHAND.